United States Patent
Bussat et al.

(10) Patent No.: US 12,449,418 B2
(45) Date of Patent: Oct. 21, 2025

(54) GAS-FILLED MICROVESICLES WITH LIGAND

(71) Applicant: Bracco Suisse SA, Cadempino (CH)

(72) Inventors: Philippe Bussat, Pers-Jussy (FR); Samir Cherkaoui, Feigeres (FR); David Lazarus, Saint-Julien-en-Genevois (FR)

(73) Assignee: Bracco Suisse SA, Cadempino (CH)

( * ) Notice: Subject to any disclaimer, the term of this patent is extended or adjusted under 35 U.S.C. 154(b) by 1109 days.

(21) Appl. No.: 17/415,974

(22) PCT Filed: Dec. 19, 2019

(86) PCT No.: PCT/EP2019/086434
§ 371 (c)(1),
(2) Date: Jun. 18, 2021

(87) PCT Pub. No.: WO2020/127816
PCT Pub. Date: Jun. 25, 2020

(65) Prior Publication Data
US 2021/0389320 A1    Dec. 16, 2021

(30) Foreign Application Priority Data
Dec. 21, 2018   (EP) .................................... 18215695

(51) Int. Cl.
*B01J 13/04* (2006.01)
*G01N 33/569* (2006.01)

(52) U.S. Cl.
CPC ........ *G01N 33/56972* (2013.01); *B01J 13/04* (2013.01)

(58) Field of Classification Search
CPC ............................ G01N 33/56972; B01J 13/04
See application file for complete search history.

(56) References Cited

U.S. PATENT DOCUMENTS

| 6,416,740 B1* | 7/2002 | Unger .................. A61K 49/223 424/9.5 |
| 2007/0128117 A1 | 6/2007 | Bettinger et al. |
| 2015/0219636 A1 | 8/2015 | Rychak et al. |

FOREIGN PATENT DOCUMENTS

| EP | 0554213 B2 | 8/2004 |
| EP | 3308779 A1 | 4/2018 |
| WO | 9409829 A1 | 5/1994 |
| WO | 2004069284 A2 | 8/2004 |
| WO | 2005063305 A1 | 7/2005 |
| WO | 2005063306 A1 | 7/2005 |
| WO | 2006018433 A1 | 2/2006 |
| WO | 2008028917 A1 | 3/2008 |
| WO | 2008075192 A2 | 6/2008 |
| WO | 2012020030 A1 | 2/2012 |
| WO | 2014096165 A2 | 6/2014 |
| WO | 2016097130 A1 | 6/2016 |
| WO | 2017117349 A2 | 7/2017 |
| WO | 2017137477 A1 | 8/2017 |

OTHER PUBLICATIONS

International Search Report and Written Opinion for PCT/EP2019/086434, mailed Jan. 23, 2020.

* cited by examiner

*Primary Examiner* — Gregory S Emch
*Assistant Examiner* — McKenzie A Dunn
(74) *Attorney, Agent, or Firm* — VIVICAR Law, PLLC

(57) ABSTRACT

Formulations of gas-filled microvesicles comprising a ligand, which may advantageously be used in methods for separating cells or biological materials. The formulations comprise a phospholipid and a suitable mixture of a pegylated phospholipid and of a pegylated phospholipid comprising a ligand.

21 Claims, No Drawings

GAS-FILLED MICROVESICLES WITH LIGAND

CROSS-REFERENCE TO RELATED APPLICATIONS

This application is the national stage application of corresponding international application number PCT/EP2019/086434, filed Dec. 19, 2019, which claims priority to and the benefit of European application no. 18215695.0, filed Dec. 21, 2018, which is hereby incorporated by reference in its entirety.

TECHNICAL FIELD

The invention relates to new formulations of gas-filled microvesicles comprising a ligand, which may advantageously be used in methods for separating cells or biological materials, e.g. by buoyancy.

BACKGROUND OF THE INVENTION

Methods for isolating a desired cell from a complex mixture of cells (e.g. in a physiological fluid such as blood or plasma) are useful in a number of biomedical fields. In one application, in the field of gene therapy, cells are harvested from a patient, treated to express the desired gene and administered back to the patient. Another possible application is for the separation of circulating tumor cells (CTCs) or circulating biomarkers (e.g. liquid biopsy).

Antibodies or other molecules can be used to label a desired cell for subsequent isolation. Antibodies may be conjugated to magnetic microparticles or nanoparticles. Upon mixing with a heterogenous cell mixture, the magnetic particles are bound to the targeted cell and then separated using a magnetic field. This concept is implemented in several commercial products (Dynabeads, Magnetic-Activated Cell Sorting "MACS®"). The main drawback is the difficulty in removing the beads from the targeted cells.

Recently, buoyancy-based methods were described (see e.g US 2015/0219636) where gas encapsulated microvesicles or microparticles are used as reagent for buoyancy-activated cell sorting (BACS). In this case, the microvesicle/cell interaction was also performed using antibodies or other molecules. As mentioned in US2015/0219636, the microvesicle binding efficiency increases with ligand density.

However, as observed by the Applicant, high ligand density could promote microvesicle aggregation (or destabilization of intermediate precursor preparations of the microvesicles suspension).

It has now been found that formulations comprising a phospholipid and a suitable mixture of a pegylated phospholipid and of a pegylated phospholipid comprising a ligand may be particularly advantageous, particularly for use in methods for separating cells or biological materials.

SUMMARY OF THE INVENTION

An aspect of the invention relates to a suspension of gas-filled microvesicles comprising a physiologically acceptable gas with a stabilizing envelope, said envelope comprising:
a) a phospholipid
b) from 1% to 8% by moles of a first pegylated phospholipid comprising a reactive moiety, at least a portion of said first pegylated phospholipid being bound to a ligand through said reactive moiety; and
c) from 1% to 12% by moles of a second pegylated phospholipid;
said suspension comprising less than 40% by moles of said ligand, either in free form or bound to said pegylated phospholipid, with respect to the molar amount of the pegylated phospholipid comprising said ligand in the envelope.

Preferably said ligand is capable of selectively binding to biotin. More preferably it is selected from the group consisting of avidin, neutravidin and streptavidin, preferably streptavidin. The ligand is preferably covalently bound to the pegylated phospholipid.

Preferably the amount of the ligand not associated with the stabilizing envelope is of less than 33%, more preferably less than 25% and even more preferably less than 20%.

The portion of the first pegylated phospholipid comprising a ligand is preferably present in the stabilizing envelope in a molar amount of from 0.03 to 0.75%, preferably 0.05%-0.7%, more preferably 0.08-0.6%.

Said first and second pegylated phospholipid ("PE-PEG"), which can be the same or different, is a phospholipid covalently linked to a polyethylene glycol (PEG) having an average molecular weight of from 1000 to 8000 g/mol, preferably from 2000 to 5000 g/mol. The PEG in said first PE-PEG has an average molecular weight (AMW) which may be equal, higher or lower with respect to the AMW of the PEG in the second PE-PEG. Preferably, the PEG in the first PE-PEG has an AMW which is the same or higher than the AMW of the PEG in the second PE-PEG.

In one embodiment, the PEG in the first and second PE-PEG has an average molecular weight of about 2000 g/mol (PE-PEG2000); preferably, the molar amount of said second PE-PEG is of at least 3.5%, more preferably of at least 5%, event more preferably at least 6%.

In another embodiment the PEG in the first and second PE-PEG has an average molecular weight of about 5000 g/mol (PE-PEG5000).

In a further embodiment the PEG in the first PE-PEG has an average molecular weight of about 2000 g/mol (PE-PEG2000) and the PEG in the second PE-PEG has an average molecular weight of about 5000 g/mol (PE-PEG5000).

In a further embodiment the PEG in the first PE-PEG has an average molecular weight of about 5000 g/mol (PE-PEG5000) and the PEG in the second PE-PEG has an average molecular weight of about 2000 g/mol (PE-PEG2000).

In preferred embodiments, the gas-filled microvesicles of the invention have advantageously a ligand density on the surface thereof of at least 8000 molecules/$\mu m^2$, preferably of at least 12000 molecules/$\mu m^2$, more preferably of at least 15000 molecules/$\mu m^2$ and even more preferably of at least 18000 molecules/$\mu m^2$, up to e.g. 50000 molecules/$\mu m^2$.

Another aspect of the invention relates to a method for manufacturing a lyophilized precursor for the preparation of a suspension of gas-filled microvesicles as above defined which comprises:
  Preparing an aqueous-organic emulsion comprising a predetermined molar amount of a phospholipid and of pegylated phospholipid comprising a reactive moiety;
  Adding a molar amount of a functionalized ligand to said emulsion, said molar amount being lower than the molar amount of said pegylated phospholipid;
  Coupling said pegylated phospholipid with said ligand;
  Lyophilizing said emulsion.

A further aspect of the invention comprises the use of the above suspension of gas-filled microvesicles in a method for separating cells. Preferably said method comprises binding said microvesicles to a desired cell in a physiological liquid and separating said cell by buoyancy.

DETAILED DESCRIPTION OF THE INVENTION

As mentioned above, an aspect of the invention relates to a suspension of gas-filled microvesicles comprising a physiologically acceptable gas with a stabilizing envelope. The stabilizing envelope comprises a phospholipid and predetermined amounts of a first pegylated phospholipid comprising a ligand and of a second pegylated phospholipid. The suspension is further characterized by comprising an amount of less than 40% by moles of said ligand not associated with the stabilizing envelope, either in free form or bound to said pegylated phospholipid, with respect to the molar amount of the pegylated phospholipid comprising said ligand.

Phospholipids

The term "phospholipid(s)" as used herein include esters of glycerol with one or preferably two (equal or different) residues of a fatty acid and with a phosphoric acid residue, wherein the phosphoric acid residue is in turn bound to a hydrophilic group, such a, for instance, choline (phosphatidylcholines—PC), serine (phosphatidylserines—PS), glycerol (phosphatidylglycerols—PG), ethanolamine (phosphatidylethanolamines—PE), inositol (phosphatidylinositol). Esters of phospholipids with only one residue of fatty acid are generally referred to in the art as the "lyso" forms of the phospholipid or "lysophospholipids". Fatty acids residues present in the phospholipids are in general long chain aliphatic acids, typically containing from 12 to 24 carbon atoms, preferably from 14 to 22; the aliphatic chain may contain one or more unsaturations or is preferably completely saturated. Examples of suitable fatty acids included in the phospholipids are, for instance, lauric acid, myristic acid, palmitic acid, stearic acid, arachidic acid, behenic acid, oleic acid, linoleic acid, and linolenic acid. Preferably, saturated fatty acids such as myristic acid, palmitic acid, stearic acid and arachidic acid are employed.

As used herein, the term phospholipids include either naturally occurring, semisynthetic or synthetically prepared products that can be employed either singularly or as mixtures.

Examples of naturally occurring phospholipids are natural lecithins (phosphatidylcholine (PC) derivatives) such as, typically, soya bean or egg yolk lecithins.

Examples of semisynthetic phospholipids are the partially or fully hydrogenated derivatives of the naturally occurring lecithins. Preferred phospholipids are fatty acids di-esters of phosphatidylcholine, phosphatidylglycerol (PG), phosphatidic acid (PA), phosphatidylethanolamine (PE), phosphatidylserine (PS), phosphatidylinositol (PI) or of sphingomyelin.

Examples of preferred phospholipids are, for instance, dilauroyl-phosphatidylcholine (DLPC), dimyristoyl-phosphatidylcholine (DMPC), dipalmitoyl-phosphatidylcholine (DPPC), diarachidoyl-phosphatidylcholine (DAPC), distearoyl-phosphatidylcholine (DSPC), dioleoyl-phosphatidylcholine (DOPC), di pentadecanoyl-phosphatidylcholine (DPDPC), 1-myristoyl-2-palmitoyl-phosphatidylcholine (MPPC), 1-palmitoyl-2-myristoyl-phosphatidylcholine (PMPC), 1-palmitoyl-2-stearoyl-phosphatidylcholine (PSPC), 1-stearoyl-2-palmitoyl-phosphatidylcholine (SPPC), 1-palmitoyl-2-oleylphosphatidylcholine (POPC), 1-oleyl-2-palmitoyl-phosphatidylcholine (OPPC), dilauroyl-phosphatidylglycerol (DLPG) and its alkali metal salts, diarachidoylphosphatidyl-glycerol (DAPG) and its alkali metal salts, dimyristoylphosphatidylglycerol (DMPG) and its alkali metal salts, dipalmitoylphosphatidylglycerol (DPPG) and its alkali metal salts, distearoylphosphatidylglycerol (DSPG) and its alkali metal salts, dioleoyl-phosphatidylglycerol (DOPG) and its alkali metal salts, dimyristoyl phosphatidic acid (DMPA) and its alkali metal salts, dipalmitoyl phosphatidic acid (DPPA) and its alkali metal salts, distearoyl phosphatidic acid (DSPA), diarachidoylphosphatidic acid (DAPA) and its alkali metal salts, dimyristoyl-phosphatidylethanolamine (DMPE), dipalmitoylphosphatidylethanolamine (DPPE), distearoyl phosphatidyl-ethanolamine (DSPE), dioleylphosphatidyl-ethanolamine (DOPE), diarachidoylphosphatidyl-ethanolamine (DAPE), dilinoleylphosphatidylethanolamine (DLPE), dimyristoyl phosphatidylserine (DMPS), diarachidoyl phosphatidylserine (DAPS), dipalmitoyl phosphatidylserine (DPPS), distearoylphosphatidylserine (DSPS), dioleoylphosphatidylserine (DOPS), dipalmitoyl sphingomyelin (DPSP), and distearoylsphingomyelin (DSSP), dilauroyl-phosphatidylinositol (DLPI), diarachidoylphosphatidylinositol (DAPI), dimyristoylphosphatidylinositol (DMPI), dipalmitoylphosphatidylinositol (DPPI), distearoylphosphatidylinositol (DSPI), dioleoyl-phosphatidylinositol (DOPI).

Particularly preferred phospholipids are DMPC, DAPC, DSPC, DPPC, DMPA, DPPA, DSPA, DMPG, DPPG, DSPG, DMPS, DPPS and DSPS. Most preferred are DMPC, DAPC, DSPC and DPPC.

Mixtures of phospholipids can also be used, such as, for instance, mixtures of DPPE and/or DSPE, DPPC, DSPC and/or DAPC with DSPS, DPPS, DSPA, DPPA, DSPG and DPPG.

Pegylated Phospholipids

The expression "pegylated phospholipid(s)" as used herein includes within its meaning any polyethylene glycol residue ("PEG") covalently bound to a phospholipid residue, such as those illustrated above.

Polyethylene glycols are typically identified by means of their average molecular weight ("AMW", e.g. number average molecular weight "Mn"); for instance, as used herein, PEG2000 identifies a polyethylene glycol with an AMW of about 2000 g/mol (typically +/−5%).

Suitable pegylated phospholipid(s) are those comprising a PEG residue having an average molecular weight of from about 1000 g/mol (i.e. PEG1000) to about 8000 g/mol (PEG8000), preferably from 2000 to 5000 g/mol (PEG5000). Specific examples of PEG polymers useful for forming the pegylated phospholipids as defined above include PEG750, PEG1000, PEG2000, PEG3400, PEG4000, PEG5000, PEG6000, PEG7000 and PEG8000. Preferably the PEG is covalently bound to a phosphatidylethanolamine ("PE") residue bearing a respective lipid chain, e.g. myristoyl, palmitoyl or stearoyl.

Examples of suitable pegylated phospholipids are for instance DMPE-PEG, DPPE-PEG and DSPE-PEG, which are generally commercially available as pegylated phospholipids with the PEG having the above indicated average molecular weights, e.g. as DMPE-PEG2000, DMPE-PEG3400, DMPE-PEG5000, DPPE-PEG2000, DPPE-PEG3400, DPPE-PEG5000, DSPE-PEG2000, DSPE-PEG3400 or DSPE-PEG5000.

Where necessary, the pegylated phospholipid may be suitably functionalized with a reactive moiety, particularly one capable of reacting with a corresponding reactive moiety on a functionalized ligand (e.g. an avidin, neutravidin or streptavidin moiety). Suitable reactive moieties include, for instance, NHS (N-hydroxy-succiminide), amino, sulfhydryl, maleimide, azide or DBCO (dibenzocyclooctyne).

For instance, if one of the two reacting components includes a reactive amino group, it can be reacted with the other component containing a suitable corresponding reactive moiety, such as an isothiocyanate group (to form a thiourea bond), a reactive ester (to form an amide bond), or an aldehyde group (to form an imine bond, which may be reduced to an alkylamine bond). Alternatively, if one of the two reacting components includes a reactive thiol group, suitable complementary reactive moieties on the other component may include haloacetyl derivatives, maleimides (to form a thioether bond) or a mixed disulfide comprising a sulphide in the form of a 2-pyridylthio group which upon reaction with a thiol derived from the thiol-bearing component results in the formation of a stable disulfide bond between the two components. Furthermore, if one of the two reacting components includes a reactive carboxylic group, suitable reactive moieties on the other component can be amines and hydrazides (to form amide or N-acyl, N'-alkyl-hydrazide functions). According to an embodiment, a maleimide-derivatized pegylated phospholipid (e.g. PE-PEG2000-Mal or PE-PEG5000-Mal) may be reacted with a ligand bearing a thiol (—SH) reactive moiety, introduced on the ligand e.g. by reaction with Sulfo-LC-SPDP (sulfosuccinimidyl 6-(3'-(2-pyridyldithio)propionamido) hexanoate).

Ligand

The ligand bound to PE-PEG and incorporated into the microvesicle's envelope is a ligand forming a specific "binding pair" with another respective molecule. Examples of ligands (and respective binding pairs) include for instance avidin, neutravidin and streptavidin, which can form a binding pair with biotin. Streptavidin is preferred for the present invention.

The ligand is suitably derivatized to introduce a reactive moiety capable of covalently reacting with a respective reactive moiety on the functionalized PE-PEG. For instance, when maleimide functionalized PE-PEG is used, a thiol moiety is introduced in the ligand to allow coupling maleimide/Thiol. When DBCO functionalized lipids were used, a azide moiety was introduced in streptavidin to allow click chemistry coupling.

Method of Preparation and Formulation

The microvesicles of the invention can be advantageously prepared according to the manufacturing method disclosed in WO2004/069284.

The preparation method comprises an initial preparation of a freeze-dried residue which comprises the steps of:
 a) preparing an aqueous-organic emulsion comprising a phospholipid, a first pegylated phospholipid comprising a reactive moiety and a second pegylated phospholipid;
 b) adding to this emulsion a functionalized ligand capable of reacting with said reactive moiety;
 c) coupling said pegylated phospholipid with said ligand; and
 d) Lyophilizing said emulsion, to obtain a freeze-dried residue.

The freeze-dried residue (e.g. collected in a glass vial) is then contacted with a biocompatible gas and subsequently reconstituted by dissolving it into a physiologically acceptable carrier liquid to obtain the desired suspension of gas filled microvesicles.

The aqueous organic emulsion can be prepared by submitting an aqueous medium and a water immiscible solvent (e.g. branched or linear alkanes, alkenes, cyclo-alkanes, aromatic hydrocarbons, alkyl ethers, ketones, halogenated hydrocarbons, perfluorinated hydrocarbons or mixtures thereof; instance cyclooctane, cyclohexane or cycloheptane) in the presence of at least one phospholipid to any appropriate emulsion-generating technique known in the art, such as, for instance, high pressure homogenization or micromixing.

Suitable phospholipids are those indicated above. In addition, the aqueous organic emulsion may further comprise a lipid, preferably a fatty acid such as, for instance palmitic acid, stearic acid, arachidonic acid or oleic acid.

Typically, the phospholipid represents the larger portion of the envelope-forming components, e.g. up to 98% mol/mol. In certain embodiments, the molar amount of phospholipid may range from 60% to 95%, preferably from 70% to 90%. The optional lipid (in particular fatty acid) may be present in a molar amount of for instance from 10% to 30%, more preferably from 15% to 25%.

The functionalized pegylated phospholipid can be any of the PE-PEG previously listed, suitably functionalized as discussed before.

It can be present in a molar amount of from 0.5% to 8%, preferably 1% to 6%.

Similarly, the functionalized ligand to be bound to the functionalized PE-PEG can be selected among those previously listed.

As observed by the Applicant, the molar amount of the functionalized ligand added in step b) is preferably lower than the molar amount of the pegylated phospholipid comprising the reactive moiety to which said ligand has to be coupled. As a matter of fact, for the specific use in the BACS method, it is preferred that limited amounts of ligand (either as such or bound to a pegylated phospholipid) remain free in the suspension, in order to minimize possible coupling competition with the targeted (e.g. biotinylated) antibody. As mentioned above, in the suspension according to the invention the amount of ligand not associated with the stabilizing envelope is of less than 40%, down to e.g. less than 20%. To limit such amount of "free" ligand, according to the process of the invention the amount of functionalized ligand is preferably added in molar ratio of 1:4 or lower (e.g. down to 1:40) with respect to the amount of pegylated phospholipid bearing the corresponding reactive moiety. More preferably said molar ratio is from 1:5 to 1:25 and even more preferably from 1:7 to 1:20.

With these relative molar ratios, the coupling yield of the ligand with the PE-PEG is generally of at least 70% (i.e. less than 30% of the ligand is not incorporated in the final stabilizing envelope of the microvesicles), preferably of at least 75%, more preferably 80% and even more preferably of at least 85%.

The unreacted reactive moieties on the PE-PEG may then be "inactivated" by reacting it with a suitable corresponding inactivating moiety. For instance, if the reactive moiety on the PE-PEG is maleimide (PE-PEG-Mal) it can be inactivated by reacting it with cysteine. Alternatively, the reactive moiety may undergo natural inactivation processes, e.g. hydrolysis, without need of adding a specific inactivating moiety.

The "inactivated" PE-PEG will thus be incorporated into the stabilizing envelope, together with the PE-PEG which has been covalently bound to the ligand, this latter being advantageously present in the stabilizing envelope in a molar amount of from 0.03 to 0.75%, preferably 0.05%-0.7%, more preferably 0.08-0.6% and even more preferably 0.1-0.5%. The "inactivated" (unreacted) PE-PEG may be present in the stabilizing envelope in a molar amount of from 0.5% to 7.5%, preferably from 1% to 6%, more preferably 1.5% to 5%.

As further observed by the Applicant, it is advantageous according to the invention to have in the aqueous-organic emulsion of steps a) to c) above a mixture of a pegylated phospholipid comprising a reactive moiety and of an additional pegylated phospholipid without said reactive moiety.

As observed by the Applicant, the amount of PE-PEGs and the molecular weight of the PEG-chains contained in said PE-PEGs are correlated in such a way to allow a suitable selection of the two, in order to provide the desired suspension of microvesicles. Said correlation can be advantageously expressed by a number identified herein as "$N_{PEG}$" defined as follows:

$$N_{PEG} = MW_1 * \text{mol} \%_1 + MW_2 * \text{mol} \%_2$$

where $MW_1$ and mol $\%_1$ respectively refer to the molecular weight and to molar % of the PEG chain contained in the pegylated phospholipid comprising a reactive moiety, while $MW_2$ and mol $\%_2$ respectively refer to the molecular weight and molar % of the PEG chain contained in the pegylated phospholipid without a reactive moiety.

For instance, if the composition comprises 2.5% of functionalized PE-PEG2000 and 1% of PE-PEG5000, the $N_{PEG}$ number is:

$$N_{PEG} = 2000*0.025 + 5000*0.01 = 100$$

As observed by the Applicant, in order to obtain stable emulsions, the number N shall preferably be higher than 90, more preferably higher than 95, up to e.g. 300, preferably 280. Preferably $MW_1$ is similar to $MW_2$, more preferably both being about 2000 (+/−5%). Preferably mol $\%_1$ is from 0.01 to 0.05, more preferably 0.02 to 0.03. Preferably mol $\%_2$ is from 0.03 to 0.12, more preferably from 0.05 to 0.10.

According to an embodiment of the invention, the pegylated phospholipid comprising a reactive moiety is a functionalized PE-PEG2000 (e.g. DSPE-PEG2000-Mal) while the second pegylated phospholipid is a PE-PEG2000 (e.g. DSPE-PE2000). The relative molar ratio between the two respective PE-PEGs is preferably from 1:1 to 1:8, preferably from 1:1.5 to 1:5 and even more preferably from 1:2 to 1:4.

According to another embodiment of the invention, the pegylated phospholipid comprising a reactive moiety is a functionalized PE-PEG2000, e.g. DSPE-PEG2000-mal while the other pegylated phospholipid is a PE-PEG5000, e.g. DPPE-. The relative molar ratio between the functionalized PE-PEG2000 and PE-PEG5000 is preferably from 5:1 to 1:3, more preferably from 4:1 to 1:2 and even more preferably from 3:1 to 1:1. According to a further embodiment, both the pegylated phospholipid comprising a reactive moiety and the second pegylated phospholipid are a PE-PEG5000. The relative molar ratio between the two PE-PEG is preferably from 5:1 to 1:2.5, preferably from 3:1 to 1:2 and even more preferably from 2.5:1 to 1:1.5.

In a preferred embodiment, the aqueous-organic emulsion may further contain a lyophilization additive, such as an agent with cryoprotective and/or lyoprotective effect and/or a bulking agent, for example an amino-acid such as glycine; a carbohydrate, e.g. a sugar such as sucrose, mannitol, maltose, trehalose, glucose, lactose or a cyclodextrin, or a polysaccharide such as dextran, chitosan and its derivatives (for example: carboxymethyl chitosan, tri methyl chitosan); or a polyoxyalkyleneglycol such as polyethylene glycol. The lyophilization additive, which is not substantially involved in the formation of the stabilizing envelope of the microvesicles, is preferably added as an aqueous solution. It may be added before the formation of the emulsion, to the formed emulsion or partly before and partly after the formation thereof. For instance, a 10% (w/w) aqueous solution of PEG4000 can be used. Typically, the amount of lyophilization additive in the emulsion before lyophilization is from 5 to 20% by weight (while the total amount of envelope forming components is typically from about 0.5% to about 1% by weight).

As observed by the Applicant, preferred aqueous-organic emulsions prepared as above indicated may be stable for a relatively long period before undergoing to the lyophilization step, typically for at least 2-3 hours or longer.

The stability of the emulsion can be determined, for instance, by measuring the concentration of microdroplets (as total number of microdroplets) in the final emulsion after the completion of the coupling step of step c) and comparing it with the concentration of microdroplets in the emulsion after 2½ hours. Typically, the percentage of remaining microdroplets shall be of at least of 80% with respect to the initial amount, preferably of at least 90% and even more preferably at least 95%.

The emulsion may then be filled into respective glass vials (e.g. DIN4, DIN8 or DIN20R) which are subjected to a lyophilization step.

After completion of the lyophilization, the headspace of the vial (containing the freeze-dried residue) is saturated with a physiologically acceptable gas and the vial is sealed (e.g. with a rubber stopper)

Any biocompatible gas, gas precursor (e.g. liquid at ambient temperature or mixture thereof may be employed to fill the above microvesicles (hereinafter also identified as "microvesicle-forming gas").

Fluorinated gases are preferred, in particular perfluorinated gases. Preferred compounds are perfluorinated gases, such as $SF_6$ or perfluorocarbons (perfluorinated hydrocarbons), i.e. hydrocarbons where all the hydrogen atoms are replaced by fluorine atoms, which are known to form particularly stable microvesicle suspensions, as disclosed, for instance, in EP 0554 213, which is herein incorporated by reference.

Preferred perfluorocarbons include, for example, $CF_4$, $C_2F_6$, $C_3F_8$, $C_4F_8$, $C_4F_{10}$, $C_5F_{12}$, $C_6F_{12}$ and $C_6F_{14}$, more preferably $CF_4$, $C_2F_6$, $C_3F_8$, $C_4F_8$ and $C_4F_{10}$.

It may also be advantageous to use a mixture of any of the above gases in any ratio. For instance, the mixture may comprise a conventional gas, such as nitrogen, air or carbon dioxide and a gas forming a stable microvesicle suspension, such as sulfur hexafluoride or a perfluorocarbon as indicated above. Examples of suitable gas mixtures can be found, for instance, in WO 94/09829, which is herein incorporated by reference. The following combinations are particularly preferred: a mixture of gases (A) and (B) in which the gas (B) is a fluorinated gas, selected among those previously illustrated, including mixtures thereof, and (A) is selected from air, oxygen, nitrogen, carbon dioxide or mixtures thereof. The amount of gas (B) can represent from about 0.5% to about 95% v/v of the total mixture, preferably from about 5% to 80%.

Particularly preferred gases are $SF_6$, $C_3F_8$, $C_4F_{10}$ or mixtures thereof, optionally in admixture with air, oxygen, nitrogen, carbon dioxide or mixtures thereof, e.g. a 35/65 (v/v) mixture of perfluorobutane or perfluoropropane and nitrogen.

The freeze-dried residue can then be reconstituted by adding an aqueous carrier into the vial and gently shaking its content, to provide the desired gas-filled microvesicles suspension. The number, dimensions and size distribution of the obtained microvesicles are substantially comparable with the number, dimensions and size distribution of the microdroplets in the preparation emulsion.

In an embodiment of the invention, the final stabilizing envelope of the gas-filled microvesicles may contain a mixture of (i) a phospholipid; (ii) optionally a fatty acid; (iii) a PE-PEG comprising a ligand; (iv) an "inactivated" PE-PEG (deriving from the functionalized PE-PEG not reacted with the ligand); and (v) optionally an additional (non-functionalized) PE-PEG.

According to an embodiment, the above components may be present in the stabilizing envelope in the following molar amounts:
  (i) Phospholipid: 60-98%, preferably 70-85%
  (ii) fatty acid: 0-30%, preferably 10-25%
  (iii) PE-PEG comprising a ligand: 0.03-0.75%, preferably 0.1-0.7%
  (iv) "inactivated" PE-PEG: 0.5-7.5%, preferably 1%-6%, more preferably 1.5-5%;
  (v) second (non-functionalized) PE-PEG: 0.5-12%, preferably 1%-10%.

In a preferred embodiment, the total molar amount of "inactivated" PE-PEG and of the second (non-functionalized) PE-PEG is from 2% to 12%, preferably from 5% to 10%.

The gas-filled microvesicles of the invention, particularly those obtained according to the above preparation method, comprise a relatively high amount of ligand on their surface, notwithstanding a relatively low amount of functionalized PE-PEG employed in the preparation thereof. The amount of ligand on the surface of the microvesicles can advantageously be expressed as density of ligand per $\mu m^2$ of the microvesicles surface. The ligand's density can be determined for instance by measuring the ligand concentration in washed suspension of microvesicles (e.g. by fluorescence, for instance with 4-biotin fluorescein for streptavidin containing microvesicles) and calculating the total surface of the microvesicles by Coulter counter measurement, as described in detail in the examples.

Microvesicles according to the present invention typically have a ligand density of at least 8000 molecules/$\mu m^2$, preferably of at least 12000 molecules/$\mu m^2$, more preferably of at least 15000 molecules/$\mu m^2$ and even more preferably of at least 18000 molecules/$\mu m^2$, up to e.g. 50000 molecules/$\mu m^2$.

Methods of Use

The gas-filled microvesicles of the invention may be advantageously used in a method for separating cells, typically by buoyancy (also known as buoyancy-activated cell sorting, "BACS"). The method can be useful for separating a desired type of cells from other cells in a physiological liquid (e.g. blood or plasma).

In particular, the separation method comprises labelling a desired cell to be separated with a suitable labelled antibody capable of binding to a specific (and selective) receptor on said cell. The microvesicles of the invention are then added to the suspension of cells to be separated (including those bearing the labelled antibody); the microvesicles of the invention will then associate through the ligand with the labelling residue bound to antibody/cell construct thus allowing separation of the cells by buoyancy (see e.g. WO 2017/117349). In a preferred embodiment the labelled antibody is a biotinylated antibody, where the biotin residue is capable of associating with a respective moiety, such as for instance an avidin, neutravidin or streptavidin residue on a gas-filled microvesicles. Thus, the microvesicles of the invention can be used for separating a wide number of cells from a physiologic liquid, provided such cell can be suitably labelled with a respective labelled (biotinylated) antibody.

Particularly preferred are formulations of gas-filled microvesicles comprising a first pegylated phospholipid which is a functionalized PE-PEG2000 (e.g. DSPE-PEG2000-Mal) and a second pegylated phospholipid is a PE-PEG2000 (e.g. DSPE-PE2000). Preferably the first pegylated phospholipid is present in a molar amount of from 1 to 5%, more preferably 1.5% to 4%; the second pegylated phospholipid is preferably in a molar amount of from 3% to 12%, more preferably 5% to 10%.

The following examples will help to further illustrate the invention.

EXAMPLES

Materials

| Product | Supplier |
|---|---|
| Streptavidin | Roche |
| Sulfo-LC-SPDP (sulfosuccinimidyl 6-(3'-(2-pyridyldithio)propionamido)hexanoate | Pierce Thermo Scientific |
| TCEP•HCl (Trichloroehtylphosphine) | Pierce Thermo Scientific |
| Phosphate buffer powder | Sigma |
| Tris EDTA buffer | Sigma |
| 4-Biotin fluorescein | Sigma Aldrich |
| DSPC | CordenPharma |
| Palmitic acid | Fluka |
| DPPE-PEG5000 | CordenPharma |
| DSPE-PEG2000-maleimide | Avanti Polar lipids |
| DSPE-PEG5000-maleimide | NOF |
| DSPE-PEG2000 | CordenPharma |
| Cyclooctane | Aldrich |
| PEG 4000 | Clariant |
| NaCl 0.9% | B. Braun |

Methods

Emulsion Size and Concentration:

The size distribution and concentration of emulsion microdroplets were measured using a Coulter counter Multisizer3 fitted with a 30 µm aperture (dilution 20 µL of sample in 100 mL of NaCl 0.9% solution–analytical volume=100 µL). Parameters such as the mean diameter in number and in volume (DN and DV respectively in µm), the total concentration of microdroplets (Conc.T. in part/mL), the concentration of microdroplets >2 µm (in part/mL), the total microdroplets surface (Surf.T. in µm$^2$/mL), the total microdroplets volume (MVC in µL/mL) were determined.

The concentration of emulsion microdroplets was determined just after dilution and 2 h30 after dilution (with gentle mixing). The stability of the emulsion was determined by dividing the concentration after 2 h30 by the concentration just after dilution.

Microvesicles Size and Concentration:

The size distribution and concentration of microvesicles (MV) were measured using a Coulter counter Multisizer3 fitted with a 30 µm aperture (dilution 50 µL of sample in 100 mL of NaCl 0.9% solution–analytical volume=100 µL). Parameters such as the mean diameter in number and in volume (DN and DV respectively in µm), the total concentration of microvesicles (Conc.T. in MV/mL), the concentration of microvesicles>2 µm (in MV/mL), the total microvesicles surface (Surf.T. in µm$^2$/mL), the total microvesicles volume (MVC in µL/mL) were obtained.

Streptavidin Concentration Determination:

The STV content was determined in native microvesicles suspension and in washed microvesicles suspension using the 4-biotin fluorescein assay.

Briefly, after coulter measurement, the microvesicles were collapsed in a ultrasound tank (Branson 5200—3×2 min) to obtain a clear solution. The solution was then sampled in 50 µL portions in eight 5 mL-glass tubes. The appropriate volume of PBS and the appropriate volume of 4-Biotin fluorescein solution (2803 µmoles/mL) were calculated to each sample to have 0.1, 0.2, 0.4, 0.75, 1.5, 2, 2.5 and 3-fold the theoretical biotin capacity. The PBS was added to the sample solution and then the corresponding 4-BF solution.

Then, the solution was mixed (vortex) and incubated 30 min at room temperature in the dark. Each mixture was then sampled in a 96-well plate (100 µL/well and 2 wells per condition) and the fluorescence was read using the Cytation 5 reader ($\lambda$exc 480 nm-$\lambda$em 525 nm). The curve fluorescence as a function of the 4-BF concentration was drawn for the four first points (low 4-BF) using a second order polynomial fit and for the four last points (high 4-BF) using a linear fit—The intersection was determined between the two curves and the STV concentration was determined using the standard curve (from free streptavidin solutions).

The STV density on microvesicles was calculated using the Total MV surface determined by the Coulter counter measurement (in molecules/µm$^2$).

Streptavidin Coupling Yield Determination:

The coupling yield was calculated by dividing the streptavidin density determined on washed microvesicles suspension by the streptavidin density determined on native microvesicles suspension (as a certain percentage of microvesicles can be removed during washing).

Example 1

Streptavidin (STV) Derivatization

A streptavidin solution was prepared by dissolving 54 mg of lyophilized streptavidin (0.85 mg of STV/mg of powder (from IBA)—860.76 nmoles) in 1.62 mL of distilled water and 1.08 mL of buffer A (50 mM phosphate, 150 mM saline pH 7.4). A clear solution was obtained (concentration ~20 mg/mL), Sulfo-LC-SPDP (2.5 mg) was dissolved in 250 µL of milliQ water. This solution (19 µmoles/mL) was freshly prepared just before the experiment.

A sample of the sulfo-LC-SPDP solution (160 µL-3 µmoles-3.5 equivalents) was added to the STV solution. The obtained solution was mixed (vortex) and incubated at room temperature for 40 min (stirred using vortex every 5 min).

Two 5 mL-Zeba columns were equilibrated using buffer B (5 mM phosphate pH 7.4)

After the incubation, the STV-SPDP solution was purified on the two zeba columns (2×1.43 mL). The volume of the purified recovered solution was ~2.9 mL.

TCEP (5.4 mg) was dissolved in 250 µL of Buffer C (Tris 500 mM, EDTA 50 mM pH:7) to obtain a 75 mM solution.

A sample of TCEP solution (103 µL-~10 equivalents) was added to the STV-SPDP solution. After mixing (vortex), the solution was incubated at room temperature for 30 min, to deprotect STV-SDPD and obtain the thiolated STV (STV-SH).

Two 5 mL-Zeba columns were equilibrated using buffer B. After the incubation, the STV-SH solution was purified on the two columns (2×1.5 mL). The volume of the recovered solution was of about 3 mL, with a concentration of STV-SH of about 185 nmoles/ml.

The STV-SH-containing solution was used for subsequent coupling reactions with PE-PEG-Mal.

Example 2

Preparation of STV Microvesicles Using DSPE-PEG2000-Maleimide

Organic phase preparation: 60 mg of DSPC/palmitic acid blend (8/2 molar ratio) was dissolved in 4.8 mL of cyclooctane at 70° C.

Aqueous phase preparation: 60 mL of PEG4000 10% in water

Before emulsification, 6.7 mg of DSPE-PEG2000-maleimide dissolved in 400 µL of 100 mM phosphate buffer pH 6 were added to the aqueous phase.

The two phases were emulsified using a Megatron MT3000 mixer at high rotation speed for 4 min. The emulsion was then heated at 60° C. for 1 hour with gentle mixing and then cooled to room temperature.

The emulsion was divided in four 14 mL fractions in 15 mL-tubes (Falcon). The STV-SH solution (prepared in example 1) was added to the emulsion in a volume such as to obtain the desired amount of nmoles of STV-SH per ml of emulsion, as indicated in table 1. The emulsion was mixed and incubated for 2 h30 at room temperature.

Emulsions were diluted twice with PEG4000 10% solution in water. The emulsion size and concentration were measured using a Coulter counter Multisizer3 (Beckman Coulter). A part of the diluted emulsion was kept 2 h30 at room temperature under gentle mixing to check the emulsion stability, expressed as the ratio between microdroplets concentration after 2 h30 ($C_1$) vs. initial microdroplets concentration ($C_0$).

The diluted emulsion was sampled in DIN20R vials (3 mL/vial). The vials were then placed on the pre-frozen freeze drier (Telstar Lyobeta 35) and lyophilized. Headspaces of the vials were filled with $C_4F_{10}/N_2$ mixture (35/65 v/v) and the vials were sealed.

The microvesicles suspension was obtained after redispersion with 6 mL of saline (0.9%) and gentle mixing. Microvesicles size and concentration were measured using a Coulter counter Multisizer3 (Beckman Coulter).

TABLE 1

| (PE-PEG2000-Mal 2.5%; $N_{PEG}$ = 50) | | | | | | |
|---|---|---|---|---|---|---|
| Prep | STV-SH/mL emulsion | Emulsion conc. ($10^9$ part/mL) | Emulsion stability (conc $C_1/C_0$) | MV total ($10^8$ part/mL) | STV density (molec./µm$^2$) | STV yield (%) |
| 1a | 0 | 2.8 | 100% | 8.8 | NA | NA |
| 1b | 0.5 | 2.5 | 67% | 5.5 | 8231 | 81 |
| 1c | 1 | 1.0 | 50% | 2.7 | ND | ND |
| 1d | 3 | 1.6 | 6% | 2.9 | ND | ND |

As inferable from the above results, the stability of the emulsion after 2 h30 dramatically decreases upon increase of the amount of STV in the emulsion.

Example 3

Preparation of STV Microvesicles Using DSPE-PEG2000-maleimide with Various Amounts of DPPE-PEG5000

Microvesicles were prepared according example 2 except that 2.5 mg, 5.1 mg or 10.3 mg of DPPE-PEG5000 (corresponding to a molar amount of 0.5%, 1% or 2%, respectively) dissolved in 250 μL of distilled water were further added to the aqueous phase before emulsification.

Tables 2 to 4 show the respective results

TABLE 2

(PE-PEG2000-Mal 2.5% + PE-PEG5000 0.5%; $N_{PEG}$ = 75)

| Prep | STV-SH/ mL Emulsion | Emulsion conc. ($10^9$ part/mL) | Emulsion stability (conc $C_1/C_0$) | MV total ($10^8$ part/mL) | STV density (molec./ μm$^2$) | STV yield (%) | PEPEG-STV mol % |
|---|---|---|---|---|---|---|---|
| 2a | 0 | 3.4 | 100% | 12.4 | NA | NA | NA |
| 2b | 0.5 | 4.0 | 93% | 10.3 | 5700 | 86 | 0.03 |
| 2c | 1 | 4.0 | 60% | 8.8 | 14000 | 81 | 0.05 |
| 2d | 3 | 4.1 | 61% | 8.1 | 37500 | 94 | 0.19 |
| 2e | 5 | 3.7 | 20% | 7.6 | 32500 | 74 | 0.24 |

TABLE 3

(PE-PEG2000-Mal 2.5% + PE-PEG5000 1%; $N_{PEG}$ = 100)

| Prep | STV-SH/ mL Emulsion | Emulsion conc. ($10^9$ part/mL) | Emulsion stability (conc $C_1/C_0$) | MV total ($10^8$ part/ mL) | STV density (molec./ μm$^2$) | STV yield (%) | PEPEG-STV mol % |
|---|---|---|---|---|---|---|---|
| 3a | 0 | 4.1 | 100% | 14.2 | NA | NA | |
| 3b | 0.5 | 4.2 | 98% | 11.7 | 5400 | 84 | 0.03 |
| 3c (n = 2) | 1 | 3.9 | 95% | 10.7 | 10000 | 86 | 0.06 |
| 3d (n = 2) | 3 | 3.9 | 100% | 10.4 | 25000 | 76 | 0.15 |
| 3e | 5 | 3.7 | 98% | 9.7 | 28500 | 55 | 0.18 |

TABLE 4

(PE-PEG2000-Mal 2.5% + PE-PEG5000 2%; $N_{PEG}$ = 150)

| Prep | STV-SH/ mL Emulsion | Emulsion conc. ($10^9$ part/mL) | Emulsion stability (conc $C_1/C_0$) | MV total ($10^8$ part/mL) | STV density (molec./ μm$^2$) | STV yield (%) | PEPEG-STV mol % |
|---|---|---|---|---|---|---|---|
| 4a | 0 | 4.0 | 100% | 14.4 | NA | NA | |
| 4b | 0.5 | 4.1 | 100% | 12.2 | 5000 | 84 | 0.03 |
| 4c (n = 2) | 1 | 3.9 | 100% | 12.1 | 7500 | 74 | 0.05 |
| 4d (n = 2) | 3 | 3.9 | 98% | 11.9 | 22100 | 67 | 0.13 |
| 4e | 5 | 3.6 | 100% | 12.3 | 12900 | 30 | 0.10 |

As inferable from the above results, the presence of 0.5% PE-PEG5000 increases the stability of the emulsion, with respect to formulations containing only PE-PEG2000-mal, at least at low concentrations of added STV; in the presence of 1% PE-PEG5000 all the emulsions are stable in time as well in the presence of 2% PE-PEG5000, although in this latter case a slight decrease in STV density and yield can be observed.

Example 4

Preparation of STV Microvesicles Using DSPE-PEG2000-Maleimide with Various Amounts of DSPE-PEG2000

Example 4a

Microvesicles were prepared according to example 2 except that 5.1 mg or 10.6 mg of DSPE-PEG2000 (corresponding to 1.9% or 3.8% molar ratio) dissolved in 400 μL of distilled water were further added to the aqueous phase before emulsification.

Results are reported in table 5 below.

TABLE 5

| Prep | STV-SH/ mL Emulsion | Emulsion conc. ($10^9$ part/mL) | Emulsion stability (conc $C_1/C_0$) | MV total ($10^8$ part/mL) | STV density (molec./ μm$^2$) | STV yield (%) | PEPEG-STV mol % |
|---|---|---|---|---|---|---|---|
| (PE-PEG2000-Mal 2.5% + PE-PEG2000 1.9%; $N_{PEG}$ = 88) | | | | | | | |
| 5a | 1 | 3.3 | 42 | 9.2 | 9200 | 91 | 0.06 |
| 5b | 3 | 3.3 | 25 | 7.8 | 31900 | 86 | 0.17 |
| 5c | 5 | 3.4 | 30 | 7.4 | 39700 | 84 | 0.28 |
| (PE-PEG2000-Mal 2.5% + PE-PEG2000 3.8%; $N_{PEG}$ = 126) | | | | | | | |
| 5d | 1 | 3.0 | 100 | 11.8 | 9000 | 87 | 0.06 |
| 5e | 3 | 2.9 | 100 | 11.0 | 25000 | 90 | 0.18 |
| 5f | 5 | 2.8 | 100 | 11.4 | 34700 | 86 | 0.28 |

While for a molar concentration of PE-PEG200 of 1.9% STV yield and density are relatively good, stability of the emulsion is relatively low.

By increasing the molar amount of PE-PEG2000 (3.8%), a substantial increase in the stability of the emulsion can be achieved.

Example 4b

Microvesicles were prepared according to example 4a, except that 16.1 mg, 22 mg or 28.1 mg of DSPE-PEG2000 (corresponding to 6%, 8% and 10% molar ratio, respectively) dissolved in 1 mL of distilled water were added to the aqueous phase before emulsification. All the compositions were prepared by adding 3 nmoles of STV per mL of emulsion.

Results are reported in table 6 below.

TABLE 6

| Prep | DSPE-PEG2000 (mol %) | Emulsion conc. ($10^9$ part/mL) | Emulsion stability (conc $C_1/C_0$) | MV total ($10^8$ part/ mL) | STV density (molec./ μm$^2$) | STV yield (%) | PEPEG-STV mol % |
|---|---|---|---|---|---|---|---|
| 6a | 6 | 2.7 | 78 | 11.6 | 25700 | 85 | 0.17 |
| 6b | 8 | 3.1 | 100 | 13.5 | 18300 | 78 | 0.18 |
| 6c | 10 | 3.9 | 87 | 14.9 | 18300 | 80 | 0.15 |

As observable from the above table, increasing molar amounts of DSPE-PEG2000 result in higher amounts of microvesicles (MV total). Furthermore, with increasing amounts of DSPE-PEG2000 the STV coupling yield remains relatively high.

$N_{PEG}$ for the three preparations in table 6 is 170, 210 and 250, respectively.

Example 5

Preparation of STV Microvesicles Using DSPE-PEG5000-Maleimide

Microvesicles were prepared according example 2 except that 13.4 mg of DSPE-PEG5000-maleimide (2.5% mol, Sunbright DSPE-050MA—NOF) were added instead of DSPE-PEG2000-maleimide.

Results are reported in table 7

TABLE 7

(PE-PEG5000-Mal 2.5%; $N_{PEG}$ = 125)

| Prep | STV-SH/mL Emulsion | Emulsion conc. ($10^9$ part/mL) | Emulsion stability (conc $C_1/C_0$) | MV total ($10^8$ part/mL) | STV density (molec./ $\mu m^2$) | STV yield (%) | PEPEG-STV mol % |
|---|---|---|---|---|---|---|---|
| 7a | 1 | 3.0 | 100% | 8.7 | 8400 | 78 | 0.05 |
| 7b | 3 | 3.1 | 100% | 6.1 | 27600 | 77 | 0.17 |
| 7c | 5 | 3.1 | 100% | 5.8 | 45400 | 86 | 0.28 |

As inferable from the above results, the sole presence of PE-PEG5000-mal allows to obtain a good stability of the emulsion as well as acceptable STV yields and STV density. Nevertheless, a relatively lower amount in the total number of bubbles is observed (which incidentally determines an increase in the STV density).

Example 6

Preparation of STV Microvesicles Using DSPE-PEG5000-Maleimide and DPPE-PE5000 or DSPE-PEG2000

Microvesicles were prepared according to example 5 except that 5.1 mg of DPPE-PEG5000 or of DSPE-PEG2000 (corresponding to a molar amount of 1% or 2%, respectively) dissolved in 250 µl of distilled water were further added to the aqueous phase before emulsification.

Results are illustrated in the following table 8

TABLE 8

(PE-PEG5000-Mal 2.5% + PE-PEG5000 1%; $N_{PEG}$ = 175)

| Prep | STV-SH/mL Emulsion | Emulsion conc. ($10^9$ part/mL) | Emulsion stability (conc $C_1/C_0$) | MV total ($10^8$ part/mL) | STV density (molec./ $\mu m^2$) | STV yield (%) | PEPEG-STV mol % |
|---|---|---|---|---|---|---|---|
| 8a | 1 | 3.6 | 100% | 11.3 | 6800 | 72 | 0.05 |
| 8b | 3 | 3.5 | 100% | 8.9 | 20500 | 68 | 0.13 |
| 8c | 5 | 3.5 | 94% | 8.2 | 36200 | 75 | 0.25 |

TABLE 9

(PE-PEG5000-Mal 2.5% + PE-PEG2000 2%; $N_{PEG}$ = 165)

| Prep | STV-SH/mL Emulsion | Emulsion conc. ($10^9$ part/mL) | Emulsion stability (conc $C_1/C_0$) | MV total ($10^8$ part/mL) | STV density (molec./ $\mu m^2$) | STV yield (%) | PEPEG-STV mol % |
|---|---|---|---|---|---|---|---|
| 9a | 1 | 3.5 | 100% | 10.3 | 7800 | 87 | 0.06 |
| 9b | 3 | 3.4 | 100% | 8.3 | 23500 | 81 | 0.16 |
| 9c (n = 2) | 5 | 3.5 | 96% | 6.6 | 35450 | 80 | 0.26 |

As inferable from the above results, while higher amount of STV-SH generally increase the STV density on the microvesicles, excessive amounts may nevertheless negatively impact other parameters, such as the total amount of microvesicles.

Example 7

Preparation of STV Microvesicles Using DSPE-PEG2000-Maleimide

Microvesicles were prepared according to example 2 with the difference that 13.6 mg of DSPE-PEG2000-Mal were used (5% molar).

TABLE 10

(PE-PEG2000-Mal 5%; $N_{PEG}$ = 100)

| Prep | STV-SH/mL Emulsion | Emulsion conc. ($10^9$ part/mL) | Emulsion stability (conc $C_1/C_0$) | MV total ($10^8$ part/mL) | STV density (molec./ $\mu m^2$) | STV yield (%) | PEPEG-STV mol % |
|---|---|---|---|---|---|---|---|
| 10a | 1 | 3.4 | 52% | 7.0 | 8208 | 91 | 0.06 |
| 10b | 3 | 3.3 | 17% | 5.1 | 36205 | 100 | 0.20 |
| 10c | 5 | 3.6 | 26% | 6.3 | 41300 | 87 | 0.28 |

The above results show that, while relatively good STV yields and density are obtained, even a relatively high amount of only the PE-PEG2000-mal may result in emulsions with relatively low stability.

Example 8

Preparation of STV Microvesicles Using DSPE-PEG2000-Maleimide and DPPE-PE5000 or DSPE-PEG2000

Microvesicles were prepared according example 7 with the difference that 2.5 mg of DPPE-PEG5000 (0.5% molar) or 3.8 mg of DSPE-PEG2000 (1.5% molar) dissolved in 300 µl of distilled water were further added to the aqueous phase before emulsification.

TABLE 11

(PE-PEG2000-Mal 5% + PE-PEG5000 0.5%; $N_{PEG}$ = 125)

| Prep | STV-SH/mL Emulsion | Emulsion conc. ($10^9$ part/mL) | Emulsion stability (conc $C_1/C_0$) | MV total ($10^8$ part/mL) | STV density (molec./ $\mu m^2$) | STV yield (%) | PEPEG-STV mol % |
|---|---|---|---|---|---|---|---|
| 11a | 1 | 3.7 | 100 | 12.8 | 6918 | 99 | 0.06 |
| 11b | 3 | 3.7 | 100 | 11.9 | 23398 | 98 | 0.19 |
| 11c | 5 | 3.6 | 100 | 10.8 | 38723 | 99 | 0.32 |

TABLE 12

(PE-PEG2000-Mal 5% + PE-PEG2000 1.5%; $N_{PEG}$ = 130)

| Prep | STV-SH/mL Emulsion | Emulsion conc. ($10^9$ part/mL) | Emulsion stability (conc $C_1/C_0$) | MV total ($10^8$ part/mL) | STV density (molec./ $\mu m^2$) | STV yield (%) | PEPEG-STV mol % |
|---|---|---|---|---|---|---|---|
| 12a | 1 | 3.1 | 100 | 11.7 | 9005 | 100 | 0.06 |
| 12b | 3 | 3.0 | 99 | 10.9 | 28317 | 100 | 0.19 |
| 12c | 5 | 3.0 | 100 | 9.6 | 43812 | 96 | 0.32 |

Example 9

Preparation of STV Microvesicles Using Variable Amounts of DSPE-PEG2000-Maleimide and 0.5% DPPE-PE5000

Microvesicles were prepared according example 4a using various molar amounts of DSPE-PEG2000-maleimide and DPPE-PEG 0.5% mol. After emulsions treatment, 3 nmoles of STV-SH/mL of emulsion were added in each emulsion. Results are in table 8

TABLE 13

(PE-PEG2000-Mal 0.5, 1.0, 2.5% + PE-PEG5000 0.5%; $N_{PEG}$ = 35, 45 and 75)

| Prep | PE-PEG2000-Mal (mol %) | MV size DN (μm) | MV total (×10$^8$ MB/mL) | STV density (molec./μm$^2$) | STV yield (%) | PEPEG-STV mol % |
|---|---|---|---|---|---|---|
| 13a (n = 1) | 0.5 | 2.1 | 6.9 | 17721 | 60 | 0.12 |
| 13b (n = 3) | 1 | 2.1 | 7.2 | 19555 | 76 | 0.16 |
| 13c (n = 11) | 2.5 | 2.1 | 7.5 | 22353 | 86 | 0.17 |

The above results show that by using a same initial amount of STV-SH, formulation with 2.5% DSPE-PEG2000-maleimide allowed obtaining higher yield of STV coupling.

Example 10

Influence of Emulsion Stability on the Final Suspension of Microvesicles

Formulations comprising DSPE-PEG2000-maleimide (2.5% molar ratio) and with various amounts of DPPE-PEG5000 (0, 0.5, 1 and 2% molar ratio) were prepared as described above, with 3 nmoles STV/mL of emulsion.

After coupling and emulsion dilution, the first half of the emulsion was sampled in vials and lyophilized. The second half of the emulsion was let 2 h30 under gentle mixing, then sampled and lyophilized (to mimic the possible time of sampling at an industrial or pilot scale).

After redispersion, the microvesicles characteristics were compared. The results are illustrated in table 14.

TABLE 14

Microvesicles from immediate distribution in vials

| Prep. | PEPEG5000 (molar ratio) | Emulsion sampling | MV size DN (μm) | MV total (×10$^8$ MB/mL) | MB > 2 μm (×10$^8$ MB/mL) |
|---|---|---|---|---|---|
| 14a1 | 0 | t = 0 | 1.48 | 2.9 | 0.5 |
| 14a2 |   | After 2 h30 | 1.67 | 0.8 | 0.2 |
| 14b1 | 0.5 | t = 0 | 1.81 | 8.1 | 2.3 |
| 14b2 |   | After 2 h30 | 1.41 | 6.0 | 0.7 |
| 14c1 | 1 | t = 0 | 1.67 | 10.5 | 2.5 |
| 14c2 |   | After 2 h30 | 1.60 | 11.2 | 2.5 |
| 14d1 | 2 | t = 0 | 1.59 | 11.7 | 2.4 |
| 14d2 |   | After 2 h30 | 1.55 | 12.0 | 2.4 |

As inferable from the above results, with higher molar amounts of PE-PEG5000 (examples 14c and 14d) a better stabilization of the emulsion can be obtained. The microvesicles characteristics obtained from a freeze-dried residue after 2 h30 from the emulsion formation were in fact similar to those obtained after immediate lyophilization of the emulsion.

Example 11

Formulations Using 1% DPPE-PEG5000 Compared to Formulations Using 8% DSPE-PEG2000

Microvesicles were prepared according to example 2 with the difference that 5 mg of DPPE-PEG5000 (1% molar, dissolved in 300) or 22 mg of DSPE-PEG2000 (8% molar, or 1 ml of distilled water), respectively, were further added to the aqueous phase before emulsification; 3 nmoles of STV-SH/mL of emulsion were added in each emulsion. Each preparation was repeated eight times (n=8)

Results are illustrated in the following table 15 (the reported values are the mean of the eight preparations of each formulation), showing that the two formulations have comparable characteristics.

TABLE 15

(PE-PEG2000-Mal 2.5% + PE-PEG5000 01% or PE-PEG2000 8%)

| Prep. | PEPEG (mol %) | Emulsion conc. (10$^9$ part/mL) | Emulsion stability (conc C$_1$/C$_0$) | MV total (10$^8$ part/mL) | STV density (molec./μm$^2$) | STV yield (%) | PEPEG-STV mol % |
|---|---|---|---|---|---|---|---|
| 15a (n = 8) | 1 | 3.7 ± 0.3 | 99 ± 6 | 9.5 ± 0.9 | 27200 ± 4000 | 84 ± 7 | 0.20 ± 0.03 |
| 15b (n = 8) | 8 | 3.0 ± 0.2 | 95 ± 8 | 12.1 ± 1.5 | 20500 ± 2000 | 80 ± 7 | 0.17 ± 0.02 |

Example 12

Cell Recovery Tests

Test Protocol

CCRF-CEM cells (from ATTC) were first cultured and expanded according the protocol from the provider. Just before the test, cells were re-suspended in BSA/EDTA buffer (1% BSA and 2 mM EDTA in DPBS, w/o Ca/Mg) at 5×10$^6$ cells/mL.

The cell suspension (1 mL, about 5×10$^6$ cells) was transferred in a 2 mL-low binding Eppendorf and 160 μL of Biotinylated mouse anti-human CD45 antibody (#555481—BD Pharmigen) were added to the cells. The mixture was incubated for 30 min at room temperature on a rotating mixer, the cells were then washed by centrifugation (400 g/5 min); the supernatant was discarded and the cells were re-suspended in 1 mL BSA/EDTA buffer (mixing 5 min on a rotating mixer).

The microvesicles suspension (0.5 ml) was then added to the cell suspension and the mixture was incubated for 20 min at room temperature on a rotating mixer. The mixture was then centrifuged (400 g/5 min) and the supernatant (cell/microbubbles complexes) was recovered by manual pipetting at the liquid's meniscus.

The gas-filled microvesicles were then collapsed (by applying positive pressure) and cells were counted in the supernatant fraction and in the infranatant fraction using a hemacytometer.

The amount of cell recovery was determined as follows: Cells supernatant/(Cells supernatant+Cells infranatant, expressed as %. The cell balance was also determined: (Cells supernatant+Cells infranatant)/initial cells. The test was validated only if the cell balance is between 90 and 110%.

Results

The effectiveness of microbubbles suspensions prepared in example 11 were assessed using the cell recovery test protocol described above. Each of the eight preparations of each formulation, 15a or 15b, was tested twice (n=2).

Results are provided in the following table 16.

TABLE 16

| Cell Recovery test | |
| --- | --- |
| Prep | Cell recovery (%) |
| 15a (n = 8) | 85 ± 5% |
| 15b (n = 8) | 97 ± 2% |

As inferable from the above result, preparations comprising a combination of PE-PEG2000-Mal and of PE-PEG2000 provide an increased recovery of cells with respect to preparations comprising PE-PEG2000-Mal and PE-PEG5000.

Similar results are obtained by using preparations 6a and 6c (with PE-PEG2000-Mal 2.5% and PE-PEG2000 at 6% or 10%, respectively).

The invention claimed is:

1. A suspension of gas-filled microvesicles comprising a physiologically acceptable gas with a stabilizing envelope, said envelope comprising:
   a) a phospholipid
   b) from 1% to 8% by moles of a first pegylated phospholipid containing a first polyethylene glycol (PEG)-chain with a first molecular weight ($MW_1$) and comprising a reactive moiety, at least a portion of said first pegylated phospholipid being bound to a ligand through said reactive moiety; and
   c) from 1% to 12% by moles of a second pegylated phospholipid containing a second PEG-chain with a second molecular weight ($MW_2$) and not comprising a reactive moiety;
   said suspension comprising less than 40% by moles of said ligand, either in free form or bound to pegylated phospholipid, with respect to the molar amount of the pegylated phospholipid comprising said ligand in the envelope,
   wherein an amount of the first and second pegylated phospholipid and a molecular weight of the first and second PEG-chain contained in said first and second pegylated phospholipid are correlated, as expressed by:

$N_{PEG} = MW_1 * \text{mol }\%_1 + MW_2 * \text{mol }\%_2$

Where:
   $MW_1$ and mol $\%_1$ respectively refer to molecular weight and to molar % of the PEG chain contained in the first pegylated phospholipid comprising the reactive moiety; and
   $MW_2$ and mol $\%_2$ respectively refer to molecular weight and molar % of the PEG chain contained in the second pegylated phospholipid not comprising the reactive moiety,
   and wherein $N_{PEG}$ is higher than 90 up to 300.

2. The suspension according to claim 1 comprising less than 33% by moles of said ligand.

3. The suspension according to claim 1 wherein the portion of the first pegylated phospholipid comprising a ligand is present in the stabilizing envelope in a molar amount from 0.03 to 0.75%.

4. The suspension according to claim 1 wherein the portion of the first pegylated phospholipid not bound to the ligand is present in a molar amount from 0.5% to 7.5% in said envelope.

5. The suspension according to claim 1 wherein said first or said second pegylated phospholipid is a phospholipid covalently linked to a polyethylene glycol having average molecular weight of from 1000 to 8000 g/mol.

6. The suspension according to claim 1 wherein said ligand is selected from the group consisting of avidin, neutravidin and streptavidin.

7. The suspension according to claim 1 wherein said ligand has a density on the surface of the envelope at least 8000 molecules/$\mu m^2$.

8. The suspension according to claim 1 wherein said first and said second pegylated phospholipid have a molecular weight of 2000 g/mol+/−5%.

9. The suspension according to claim 8 wherein said envelope comprises from 1% to 5% by moles of said first pegylated phospholipid and from 5% to 10% by moles of said second pegylated phospholipid.

10. The suspension according to claim 9 wherein the relative molar ratio between the said first and said second pegylated phospholipid is from 1:1 to 1:8.

11. The suspension according to claim 1 wherein the molar amount of phospholipid is from 60% to 95%.

12. The suspension according to claim 1 further comprising a lipid.

13. The suspension according to claim 12 wherein said lipid is a fatty acid.

14. The suspension according to claim 13 wherein the molar amount of fatty acid is from 10% to 30%.

15. The suspension according to claim 1, wherein said first or second pegylated phospholipid is a pegylated phosphatidylethanolamine (PE-PEG).

16. The suspension according to claim 15 wherein said PE-PEG is selected among pegylated dimyristoyl-phosphatidylethanolamine (DMPE-PEG), pegylated dipalmitoylphosphatidylethanolamine (DPPE-PEG) and pegylated distearoyl phosphatidyl-ethanolamine (DSPE-PEG).

17. The suspension according to claim 1 wherein said phospholipid is selected from dimyristoyl-phosphatidylcholine (DMPC), diarachidoyl-phosphatidylcholine (DAPC), distearoyl-phosphatidylcholine (DSPC), dipalmitoyl-phosphatidylcholine (DPPC), dimyristoyl phosphatidic acid (DMPA), dipalmitoyl phosphatidic acid (DPPA), distearoyl phosphatidic acid (DSPA), dimyristoylphosphatidylglycerol (DMPG), dipalmitoylphosphatidylglycerol (DPPG), distearoylphosphatidylglycerol (DSPG), dimyristoyl phosphatidylserine (DMPS), dipalmitoyl phosphatidylserine (DPPS) and distearoylphosphatidylserine (DSPS).

18. The suspension according to claim 1 wherein $MW_1$ and $MW_2$ are both 2000+/−5%.

19. The suspension according to claim 1 wherein mol $\%_1$ is from 0.01 to 0.05, and mol $\%_2$ is from 0.03 to 0.12.

20. A method for cells separation, which comprises:
  labelling cells in a liquid with a labelled antibody capable of binding to a receptor on said cells;
  adding a suspension of gas-filled microvesicles according to claim 1 to the cells, whereby the gas-filled microvesicles associate with the labelled antibody through the ligand; and
  separating the cells from other cells in the liquid.

21. A method for manufacturing a lyophilized precursor for the preparation of a suspension of gas-filled microvesicles as defined in claim 1, which comprises:
  preparing an aqueous emulsion comprising a phospholipid, a first pegylated phospholipid comprising a reactive moiety and a second pegylated phospholipid;
  adding a functionalized ligand to said emulsion capable of reacting with said reactive moiety;
  coupling said pegylated phospholipid with said ligand; and
  lyophilizing said emulsion to obtain a freeze-dried residue.

* * * * *